United States Patent [19]

Bingham

[11] Patent Number: 4,867,338
[45] Date of Patent: Sep. 19, 1989

[54] HIGH TEMPERATURE SEAL

[75] Inventor: Henry Bingham, Selcourt, Springs, Transvaal, South Africa

[73] Assignee: Boart International Limited, Boart Place, Oxford Park, Sandton, Transvaal, South Africa

[21] Appl. No.: 761,627

[22] Filed: Aug. 1, 1985

[30] Foreign Application Priority Data

Aug. 2, 1984 [ZA] South Africa ............... 84/5990

[51] Int. Cl.⁴ .................. B65D 53/02; F16J 15/08; F16K 25/00
[52] U.S. Cl. ................... 220/378; 220/435; 251/359; 277/26; 277/170; 277/236
[58] Field of Search ............ 220/378, 327, 328; 376/205; 277/26, 236, 190; 285/113, 905, 187; 403/30; 251/314, 315, 360, 363, 357, 359, 328, 332, 333, 365

[56] References Cited

U.S. PATENT DOCUMENTS

| | | | |
|---|---|---|---|
| 1,175,980 | 3/1916 | Osborne | 251/357 X |
| 1,616,672 | 2/1927 | Wilson | 251/333 |
| 1,709,807 | 4/1929 | Purnis | 251/365 |
| 1,795,433 | 3/1931 | Leipert | 251/359 X |
| 1,949,613 | 3/1934 | McDonald | 251/359 X |
| 2,448,483 | 8/1948 | Bassett | 251/359 X |
| 2,617,554 | 11/1952 | Smith | 220/328 |
| 2,641,381 | 6/1953 | Bertrand | 220/378 |
| 2,760,673 | 8/1956 | Laurent | 285/113 X |
| 2,989,209 | 6/1961 | Hersman | 220/327 |
| 3,074,591 | 1/1963 | Raver | 220/327 |
| 3,191,617 | 6/1965 | Meddox | 251/357 X |
| 3,191,905 | 6/1965 | Brown | 251/360 X |
| 3,451,585 | 6/1969 | Jorgensen | 376/205 X |
| 3,598,145 | 8/1971 | Wolfson | 251/360 X |
| 3,695,482 | 10/1972 | Smith | 220/378 X |
| 3,742,976 | 7/1973 | Bailey | 251/332 X |
| 3,805,992 | 4/1974 | Jorgensen | 220/378 |
| 3,905,577 | 9/1975 | Karpenko | 251/333 X |
| 4,167,351 | 9/1979 | Bindin | 403/30 |
| 4,443,016 | 4/1984 | Schungel | 220/378 X |

FOREIGN PATENT DOCUMENTS

| | | | |
|---|---|---|---|
| 140041 | 4/1953 | Sweden | 251/315 |
| 860465 | 2/1961 | United Kingdom | 251/333 |
| 2087503 | 5/1982 | United Kingdom | 403/30 |
| 2096279 | 10/1982 | United Kingdom | 251/359 |

*Primary Examiner*—Allan N. Shoap
*Attorney, Agent, or Firm*—Pennie & Edmonds

[57] ABSTRACT

In a high temperature seal between a closure member and a rim with interengaging hard metal rings, the ring on the rim rests on a conical shoulder and the underside of the ring is complimentary shaped, so that as the shoulder expands circumferentially the ring slides down the conical surface and remains bedded on the shoulder.

8 Claims, 1 Drawing Sheet

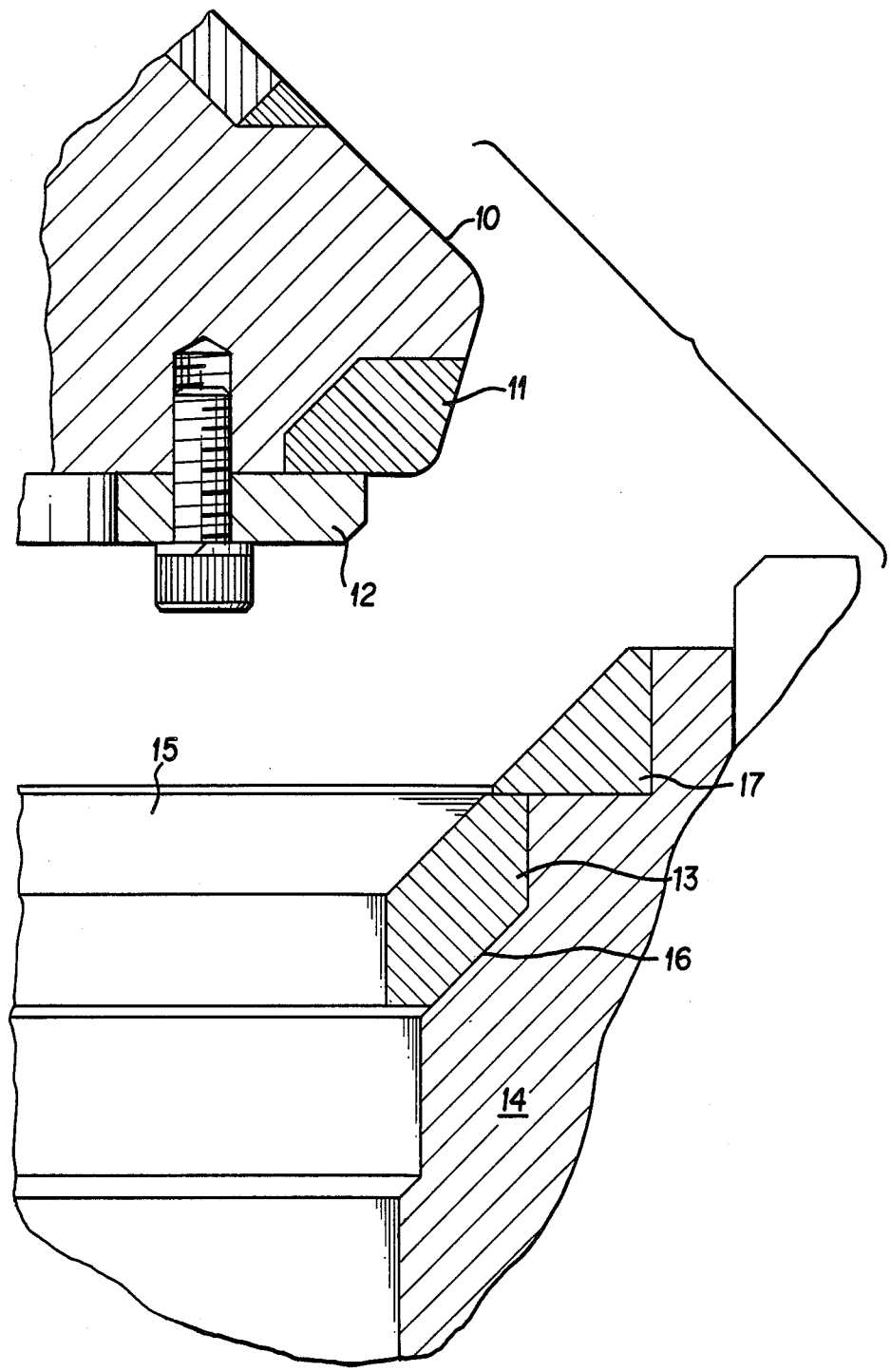

HIGH TEMPERATURE SEAL

BACKGROUND TO THE INVENTION

This invention relates to a high temperature seal of the kind which is used to close off reactors and vessels under high temperature conditions at their inlets or outlets.

In such a seal a closure member such as a cone or bell is caused to move relatively to an annular seat. If the material passing through is hot and abrasive the sealing edges of the cone and seat can wear away unacceptably fast. It has therefore been proposed to make the sealing edges of a hard metal such as cobalt cemented tungsten carbide. However, unless it is solidly supported at all times, a hard metal body easily spalls and cracks under impact forces such as would arise during the forcible closure of a cone on a seat.

Hard metal and steels from which reactor vessels are usually made have different coefficients of expansion, steel expanding more than hard metal. The result is that a ring of hard metal fitted on an inwardly facing shoulder tends to become loose as the temperature goes up, and closure impact on the ring could thus cause it to break.

SUMMARY OF THE INVENTION

According to the invention the shoulder on which the ring rests and on which it is held down is formed as a part conical surface and the underside of the ring is complementally conical, so that as the shoulder expands circumferentially the ring slides down the conical surface and remains bedded on the shoulder.

The angle of inclination on the shoulder preferably varies between 30° and 60°.

DESCRIPTION OF THE DRAWING

The FIG. is a fragmentary section through a cone and its seat.

DESCRIPTION OF AN EMBODIMENT

In the illustrated embodiment a cone 10 carries a ring 11 of cemented tungsten carbide. The ring 11 is held in place by means of a locating annulus 12.

The cone 10 is arranged to move up and down relatively to a seat formed by having 13 around the rim of a vessel 14. The ring 13 is shaped as shown to have a seating surface 15 which is spheroidal and a base 16 which is part conical and makes an angle of 45° with the vertical. The ring 13 is held down by means of an annular fillet 17.

As shown the base 16 makes an angle of 45° with the vertical. Any angle of between 30° and 60° has been found to be suitable.

In use all parts heat up to fairly high temperatures. As a result the steel parts such as the body of the cone 10 and the vessel 14 expand more than the rings 11 and 13. The differential expansion on the cone 10 can be accommodated by making the ring 11 a slightly loose fit around the cone 10 at the start. In the case of the ring 13, the vessel 14 tends to expand away from it. This is compensated for by the incline of the base 16. Differential expansion between the vessel 14 and the ring 13 causes the ring 13 to move in a downward direction while remaining firmly seated or bedded on the vessel 14.

If the cone 10 is moved down and the ring 11 impacts on the surface 15 of the ring 13, there is a solid resistance and the ring 13 remains intact.

The ring 11 is made of a softer grade of cemented tungsten carbide than that of the ring 13.

I claim:

1. In a closure assembly including a closure member and rim surrounding an opening with the closure member being adapted to close on the rim by movement along a predetermined path toward the rim and the closure member and rim including hard metal heat expandable rings adapted to engage in seating relationship with each other characterized in that:
    (a) the ring on the closure member has a seating surface facing toward the rim along said predetermined path for seating engagement with the ring on the rim;
    (b) the ring on the rim has a seating surface against which the seating surface on the ring on the closure member seats as the closure member is moved along said path toward the rim;
    (c) the rim includes an axially extending inner annular wall which defines at least a portion of the opening, the rim further including a heat expandable annular shoulder of material having a greater coefficient of expansion than that of the ring on the rim, and said shoulder being formed to define a radially inwardly facing conical surface extending continuously to said inner annular wall;
    (d) the ring on the rim has a radially outwardly facing conical surface mating with and restrained against movement and in abutting relation on the conical surface of the shoulder when the ring on the rim and the shoulder are at the same temperature so that as the shoulder expands radially circumferentially outwardly upon heating, the ring on the rim is permitted to move parallel to said predetermined path and down the conical surface of the shoulder, so as to remain bedded thereon; and wherein
    (e) the rim includes a clamp for holding down the ring on the rim against movement along said path away from said shoulder.

2. The closure assembly of claim 1 wherein said conical surfaces of said ring and said shoulder are surfaces of revolution and the angle made by said surfaces of revolution with respect to the axis of motion of said closure member is between 30° and 60°.

3. The closure assembly of claim 2 wherein said angle is substantially 45°.

4. The seal of claim 1 wherein the material of said shoulder is steel and the material of said seat member is a cemented carbide.

5. The seal of claim 1 wherein said closure member contacts said seat member at an edge thereof, said edge and the cooperating mating surface of the seat member being circular with respect to said axis of motion.

6. The seal of claim 5 wherein said edge is radiussed uniformly.

7. The seal of claim 6 wherein said cooperating mating surface of said seat member, against which said radiussed edge of said closure member is urged to form a seal therebetween, is spheroidal, having a radius substantially greater than that of said radiussed edge.

8. The seal of claim 7 wherein said radiussed edge of said closure member is formed of a material which is softer than the material of said seat member.

* * * * *